Oct. 15, 1968  S. M. WARGO  3,405,960
LATCH MECHANISM

Filed May 27, 1965  2 Sheets-Sheet 1

INVENTOR.
STEVE M. WARGO
BY Hoffmann and Yount

ATTORNEYS

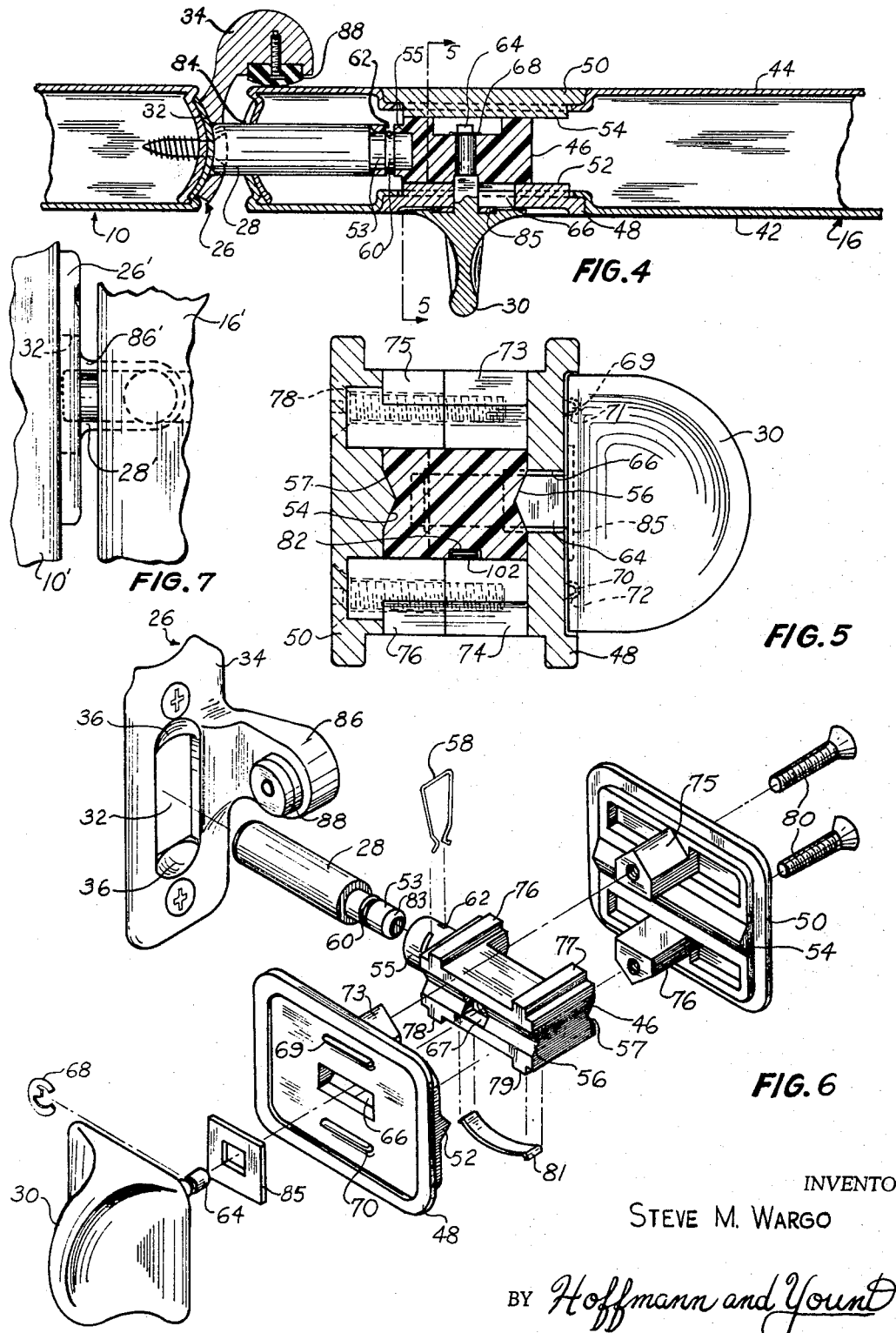

United States Patent Office 3,405,960
Patented Oct. 15, 1968

3,405,960
LATCH MECHANISM
Steve M. Wargo, Mentor, Ohio, assignor to The Mills Company, Cleveland, Ohio, a corporation of Ohio
Filed May 27, 1965, Ser. No. 459,233
3 Claims. (Cl. 292—145)

The present invention relates to a latch mechanism and in particular to a manually operated bolt-type latch mechanism for a door.

A principal object of the invention is the provision of a novel latch mechanism for locking a closure member or structure in a closed position with respect to a second structure the entire portion of which is detachably secured to the closure member in such a manner that there is no direct connection there between the portion of the latch mechanism and the closure member per se so that the portion can readily be removed from the closure member without damage or otherwise defacing the closure member in which it is mounted.

Another principal object of the invention is the provision of a novel latch mechanism for locking a closure member or structure in a closed position with respect to a second structure and which provides for unlocking the closure member in response to movement of one of the structures relative to the other in a direction other than the normal direction of relative movement between the structures in the closing and opening of the closure member.

A further object of the invention is the provision of a novel, manually operated latch mechanism for use with a structure having an opening at least partially closed by a door, which latch mechanism is effective to lock the door in closed position but which permits opening of the door in response to movement of the door while locked in a direction different from its principal direction of movement in opening and closing the structure.

Another object of the invention is the provision of a novel and improved latch mechanism for a door adapted to close a compartment or the like and which latch mechanism is normally actuated from the inside of the compartment to lock and unlock the door but which incorporates a safety feature which permits the door to be unlocked from outside the compartment by movement of the door at right angles to the direction of its normal movement in opening and closing the compartment.

A further object of the invention is the provision of a novel latch mechanism for locking a compartment door in closed position characterized by a first latch member carried by the door for cooperation with a second latch member on the compartment wall, actuating means for effecting horizontal movement of the first latch member into engagement with the second latch member to lock and unlock the door and accessible only from the interior of the compartment, and means associated with the latch members when in engaged relationship to move them out of engagement in response to vertical movement of the first latch member relative to the second latch member.

The invention relates to certain constructions and arrangement of parts, and further objects and advantages of the invention will become apparent to those skilled in the art to which it relates from the following description of the preferred embodiment described with reference to the attached drawings forming a part of the specification and in which:

FIG. 4 is a sectional view taken substantially along line 4—4 of FIG. 3;

FIG. 5 is a sectional view taken substantially along line 5—5 of FIG. 4;

FIG. 6 is an exploded view of the latch mechanism according to the present invention; and FIG. 7 is a fragmentary view similar to a portion of FIG. 3, but showing an alternative construction.

Figures 1, 2:
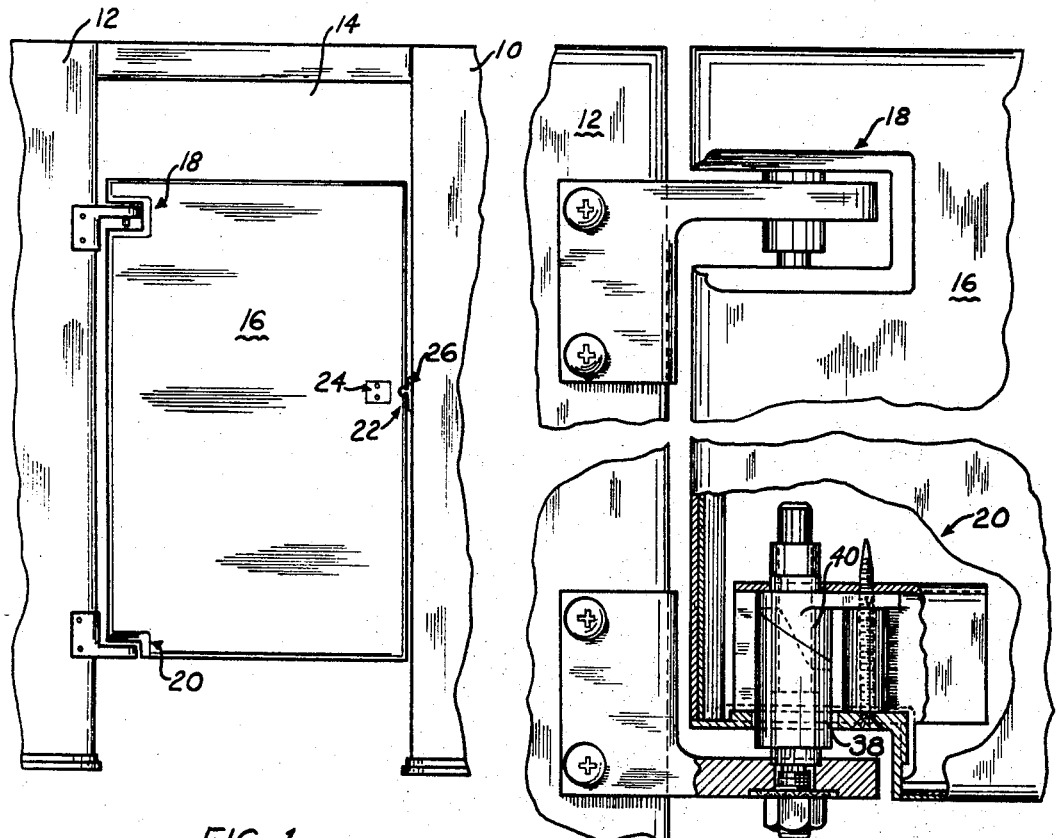
FIG. 1 is a partial side elevation of a partition structure including a door and embodying the present invention.
FIG. 2 is a fragmentary side elevation with parts broken away showing the hinge means for the door.
Figure 3:
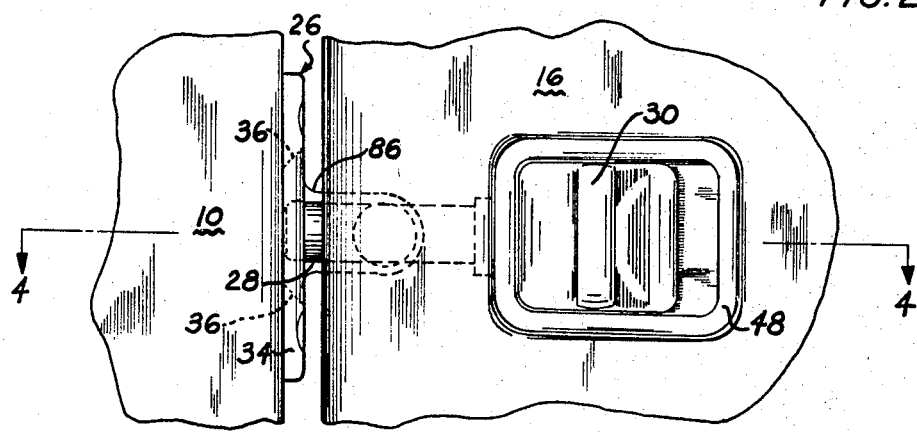
FIG. 3 is a fragmentary view from inside the compartment showing the latch mechanism in elevation.

Referring to the drawings wherein the preferred embodiment of the invention is disclosed and in particular to FIG. 1 which discloses a portion of a front wall of a compartment or cubicle comprising a right wall panel 10, a left wall panel 12 arranged to define an access opening 14 which is at least partially closed by a hinged door 16. The door is hinged to panel 12 by upper and lower hinge assemblies 18, 20 respectively, and swings thereon to open and closed positions. The door 16 is latched in closed position by means of a latch mechanism indicated generally by reference numeral 22 and includes a first latch member 24 mounted in door 16 and a cooperating second latch member 26 mounted on an edge of wall panel 10. The first latch member 24 includes a slidable bolt 28 mounted in a concealed manner in door 16 and is movable horizontally by means of a handle 30, accessible from inside the compartment only, into engagement with an elongated bolt receiving recess 32 in keeper 34 which locks the door to wall panel 10. A person desiring to use the compartment which compartment may, for example, form an enclosure for a toilet, shower, dressing room, or the like, swings the door 16 to an open position and enters the compartment. After the door is closed, handle 30 is moved to the left, as viewed in FIG. 3, sliding bolt 28 into locking engagement with recess 32. To leave the compartment, the occupant slides handle 30 to the right which withdraws the bolt 28 from recess 32 and the door can then be swung to its open position.

The lock shown provides a safety feature which permits the door to be opened from outside the compartment, or cubicle, after it has been locked by an occupant who subsequently is unable to unlock the door due to illness, etc., by lifting door 16 vertically on hinges 18, 20 a sufficient distance so that bolt 28 moves vertically in recess 32 into engagement with an inclined cam surface 36 formed in the keeper 34 at the upper end of recess 32. The cam surface 36 moves bolt 28 horizontally free of the keeper recess 32 and the door is then free to swing to its open position.

It can be appreciated that the upper and lower hinges 18, 20 must be constructed to permit the vertical bodily movement of the door relative to the panels 10 and 12 in addition to providing normal pivoting of the doors about a vertical axis. In the preferred embodiment the door hinges 18 and 20 are of the type disclosed in my United States Patent No. 3,113,649 issued December 10, 1963, and will not be described herein in detail. Suffice it to say that the hinges 18 and 20, as disclosed in detail in FIG. 2, provide the required door movements and in addition provides for automatic centering of the door relative to door panels 10 and 12 in the closed position. Hinge 20 includes a lower cam 38 fixedly secured to wall panel 12 and an upper movable cam 40 carried by door 16 and which cams have mating cam surfaces. The lower cam surface is inclined so that when the door is swung to the open position the cam surface of the upper moving cam 40 rides up on the inclined cam surface of cam 38 and upon release of the door, rides down the inclined cam surface thereof and effects closing of the door. Upper hinge 18 is constructed to accommodate the required vertical movements of the door swinging open and closed and moving bodily vertically relative to wall panels 10 and 12 during unlatching from outside the compartment.

The door 16 and wall panels 10 and 12 are constructed, in the preferred embodiment, in accordance with the disclosure of the United States patent to Hult, No. 2,776,029 issued January 1, 1957, and include spaced plates having overlapping interlocking marginal edges. The bolt 28 is slidably supported between interior and exterior door panel members 42 and 44 by a carriage 46 which slidably engages horizontally extending V-ways 52 and 54 formed integral on mounting members 48 and 50 respectively. The mounting members 48 and 50 are flush mounted in recesses formed in the door panel members 42 and 44 to provide a neat appearance.

The bolt carriage 46 is preferably constructed from Delrin, or other self-lubricating type material, and includes V-shaped grooves 56 and 57 which slidably engage ways 52 and 54 to provide for guided horizontal sliding movement of the bolt carriage relative to the mounting members 48 and 50. Bolt 28 is detachably connected to a sleeve 55 on the keeper side of the bolt carriage and into which the bolt end 53 having a reduced diameter extends and is secured thereto by means of a spring clip 58 which engages a circumferential groove 60 in the end of the bolt through slots 62 disposed intermediate the ends of sleeve 55. The handle 30 is connected to the bolt carriage 46 by means of a projecting stud 64 which is adapted to extend through an elongated opening 66 in mounting member 48 and through an opening 67 in carriage 46 and is secured thereto by means of a C-shaped clip 68.

The sliding movement between handle 30 and the engaging face of mounting member 48 is facilitated by means of a self-lubricating-type washer 85, such as Delrin, which is assembled on the stud prior to inserting the stud into carriage 46. The handle is guided in its movement over the mounting 48 by longitudinally extending projections 69 and 70 above and below the opening 66 in the mounting member which projections engage in longitudinally extending tracking grooves 71 and 72 in the side of the handle adjacent to the mounting member. Vertically spaced upper and lower projecting members 73 and 74 project from mounting member 48 above and below way 52. Cooperating projecting members 75 and 76 extend from mounting member 50 and abut projections 73 and 74, respectively, to space the mounting members. The adjacent sides of the projecting members 73, 74 and 75, 76 assist in guiding the carriage 46. The projections also function to limit the extent of movement of the bolt carriage by the engagement therewith of upper and lower integral projections 76, 77, 78 and 79 on opposite ends of the bolt carriage. The bolt carriage is held in this assembled relationship by suitable threaded fasteners 80 which extend through mounting member 50 and projections 75 and 76 and into threaded openings in projecting members 73 and 74.

To insure that the bolt carriage will not be loose in the mounting members 48, 50, a spring 81 is provided and seats in a slot 82 in the bottom surface of the carriage and exerts a pressure between the carriage and lower projecting member 74 to urge the upper carriage surface into contact with the under surface of the upper projections 73 and 75.

The first latch mechanism 24 is removably assembled in door 16 by first pre-assembling handle 30, washer 85, body member 48 and bolt carriage 46. This pre-assembly is accomplished by projecting stud 64 through the opening in washer 85 and by positioning bolt carriage 46 between projections 73 and 74 of mounting member 48 with spring 81 held in slot 82 of the carriage 46 by the lower projection 74. Stud 64 is then inserted through opening 66 in the member 48 through the opening 67 in carriage 46 so that the groove on the end thereof is exposed on the opposite side of the carriage member whereupon the C-clip 68 is snapped into the groove of stud 64 and secures the members. Also spring 58 has been snapped onto sleeve 55 in groove 62. Mounting members 48 and 50 are seated in their associated recesses in door panels 42 and 44 respectively. The threaded fasteners 80 are extended through mounting member 50, projecting members 75 and 76 and secured in the threaded openings in projecting members 73 and 74. Thereafter bolt 28 can be inserted through an opening 84 in the leading edge of the door by linear movement parallel to the path of movement of the bolt carriage 46 until spring 58 engages notch 60 to secure the bolt in sleeve 55. If desired, the end of the reduced diameter portion 53 of the bolt 28 may be bevelled as shown at 83 to facilitate entrance thereof between the tines or sides of the U-shaped spring 58. The above described assembly of the first latch mechanism in the door is such to permit quick removal thereof from the door to replace worn out parts thereof, or to remove the latch mechanism in toto in the event the door is damaged, all this being accomplished without damage to the door or latch mechanism.

The second latch mechanism 26 is secured to the edge of wall panel member 10 and positioned opposite opening 84 in the door so that bolt 28 when extended by handle 30 will be positoned in recess 32 to effect locking of the door. A door stop 86 is formed integrally with keeper 34 and has a bumper 88 made of resilient material which engages the exterior door panel 44 when the door is closed. When in this position bolt 28 is aligned with recess 32 so that upon subsequent movement of handle 30 relative to mounting member 48 the bolt will be extended into recess 32 of keeper 34.

Summarizing the operation of the present invention, the bolt 28 is disposed initially in door 16 and the door is thus free to swing on hinges 18 and 20 to its open position whereupon the occupant can enter the compartment. Releasing of the door causes the door to swing to its closed position due to the action of the centering hinge assembly 20 and is stopped by the exterior door panel 44 abutting bumper 88. The occupant grasps handle 30 and slides it to the left as viewed in FIG. 3 extending bolt 28 into bolt recess 32 of keeper 34 to lock the door. In normal use, the occupant desiring to leave the compartment slides handle 30 to the right as viewed in FIG. 4 moving bolt 28 out of recess 32 and back into its concealed position in door 16. In the event that the occupant faints or otherwise is incapable of unlatching the door, an attendant or person outside of the compartment can grasp the bottom edge of door 16 while the door is in its locked position and move the door bodily vertically relative to wall panels 10 and 12 thereby causing bolt 28 to move vertically in slot 32 into engagement with the upper inclined cam surface 36. Cam surface 36 cams the bolt back towards the door and out of engagement with the keeper. This action permits the door to be swung open on its hinges so that the attendant can then enter the compartment and render assistance to the enfeebled occupant.

The afore-described latch mechanism is flush mounted in the door panel with the engaging portions of the latch mechanism seated in coined or depressed areas of complementary, non-circular configurations and the construction is such that there is no direct connecting members, such as, screws, bolts, etc. between the latch mechanism in the door and the door proper. Due to this construction attachment and removal of the latch mechanism to and from the door for installation, repair or replacement, etc., does not deface or otherwise damage the latch mechanism or the door.

The latch mechanism also provides an additional cam surface 36 adjacent the bottom end of the recess 32 so that keeper 34 is capable of being reversely mounted to accommodate doors hinged along the side opposite to the hinged side, illustrated in FIG. 1, and to provide a cam surface which is responsive to downward door movement to cam the bolt out of the keeper recess. As an alternative construction either or both of the cam surfaces 36 can be transferred to the top and/or bottom sides of the projectable end of the bolt as illustrated in FIG. 7 in which the corresponding parts are designated by the same reference characters with a prime mark affixed thereto. In this event the groove 60 in the bolt is preferably replaced with two vertical side slots so that the bolt will not be free to rotate. Also the door stop 34, can be omitted where desired, to permit the door to swing in opposite directions to open.

The invention is particularly useful in hospitals, nursing homes for the aged, etc., where the occupants of the compartment might faint or become too ill to remove themselves therefrom after entering the compartment and locking the door. Under such circumstances personnel can open the door expeditiously from outside the compartment without destroying the door, adjacent partitions, or the means for latching the door and render assistance to the occupant.

While a preferred embodiment of the present invention has been described in considerable detail, it is my intention to cover further constructions, modifications and arrangements which fall within the ability of those skilled in the art and within the scope and the spirit of the present invention.

Having described my invention, what I claim is:

1. In a latch mechanism:
   (a) a frame or body assembly comprising
      (i) a pair of mounting members adapted to be assembled with one another in a door in fixed position,
         (a) one of said mounting members having an elongated linear slot therethrough;
      (ii) projections on at least one of said mounting members and extending between said mounting members;
      (iii) opposed linear guide surfaces on facing sides of said mounting members extending parallel with the length of said slot;
      (iv) opposed linear guide surfaces on facing sides of said projections extending parallel with the length of said slot and orientated 90° with respect to said guide surfaces on said mounting members;
   (b) a bolt carriage interposed between and slidably supported for linear movement by said guide surfaces;
   (c) means for biasing said bolt carriage against at least one facing side of said projections;
   (d) a handle at the exterior side of said mounting member having said slot therein;
   (e) an operable connection between said bolt carriage and said handle extending through said slot whereby said bolt carrier may be reciprocated in a linear path upon linear reciprocation of said handle;
   (f) a bolt;
   (g) said bolt carriage having an aperture in one end thereof adapted to receive one end of said bolt and having slots disposed intermediate the ends of said aperture; and,
   (h) means disposed in said slots for connecting said bolt to said bolt carriage operable upon movement of said one end of said bolt into said aperture in said bolt carriage by linear relative movement between said bolt carriage and bolt parallel with said linear path of movement of said bolt carriage.

2. In a latch mechanism: a frame or body assembly comprising a pair of mounting members adapted to be assembled with one another in a door in fixed position, one of said mounting members having an elongated linear slot therethrough; projections on at least one of said mounting members and extending between said mounting members; opposed linear guide surfaces on facing sides of said mounting members extending parallel with the length of said slot; opposed linear guide surfaces on facing sides of said projections extending parallel with the length of said slot and orientated 90° with respect to said guide surfaces on said mounting members; a bolt carriage interposed between and slidably supported for linear movement by said guide surfaces; a handle at the exterior side of said mounting member having said slot therein; an operable connection between said bolt carriage and said handle extending through said slot whereby said bolt carriage may be reciprocated in a linear path upon linear reciprocation of said handle; a bolt; said bolt and said bolt carriage having grooves therein aligned with one another when said bolt and said bolt carriage are assembled together, and a member in one of said grooves biased to a position projecting outwardly thereof and engageable with the other of said grooves upon linear relative movement between said bolt carriage and bolt parallel with said linear path of movement of said bolt carriage.

3. In a latch mechanism: a frame or body assembly comprising a pair of mounting members adapted to be assembled with one another in a door in fixed position, one of said mounting members having an elongated linear slot therethrough; projections on at least one of said mounting members and extending between said mounting members; opposed linear guide surfaces on facing sides of said mounting members extending parallel with the length of said slot; opposed linear guide surfaces on facing sides of said projections extending parallel with the length of said slot and orientated 90° with respect to said guide surfaces on said mounting members; a bolt carriage interposed between and slidably supported for linear movement by said guide surfaces; means for biasing said bolt carriage against at least one facing side of said projections; a handle at the exterior side of said mounting member having said slot therein; an operable connection between said bolt carriage and said handle extending through said slot whereby said bolt carrier may be reciprocated by said handle; a bolt; said bolt carriage having an aperture in one end thereof adapted to receive one end of said bolt; said bolt and said bolt carriage having grooves therein aligned with one another when said bolt and said bolt carriage are assembled together, and a member in one of said grooves biased to a position projecting outwardly thereof and engageable with the other of said grooves upon movement of said one end of said bolt into said aperture in said bolt carriage by linear relative movement between said bolt carriage and bolt parallel with said linear path of movement of said bolt carriage.

References Cited
UNITED STATES PATENTS

| 2,876,873 | 3/1959 | Benham | 292—337 X |
| 16,676 | 2/1857 | Adams | 292—340 |
| 3,181,904 | 5/1965 | Fallarino et al. | 292—93 |

MARVIN A. CHAMPION, *Primary Examiner.*

J. R. MOSES, *Assistant Examiner.*